United States Patent [19]
Hayes et al.

[11] 3,877,813
[45] Apr. 15, 1975

[54] SELF-COMPENSATING INTERFEROMETER

[75] Inventors: Cecil L. Hayes, Placentia; Walter C. Davis, Tustin, both of Calif.

[73] Assignee: Rockwell International Corporation, El Segundo, Calif.

[22] Filed: Sept. 17, 1973

[21] Appl. No.: 398,282

Related U.S. Application Data

[63] Continuation-in-part of Ser. No. 282,621, Aug. 21, 1972, abandoned.

[52] U.S. Cl. .................................. 356/106 R; 356/5
[51] Int. Cl. ............................................. G01b 9/02
[58] Field of Search ............ 356/106, 107, 113, 28, 356/5; 343/14

[56] References Cited
UNITED STATES PATENTS

| | | | |
|---|---|---|---|
| 3,120,659 | 2/1964 | Wells et al. | 343/14 |
| 3,532,890 | 10/1970 | Denton | 350/169 |
| 3,687,517 | 8/1972 | Brun | 356/28 |

Primary Examiner—Ronald L. Wibert
Assistant Examiner—Conrad Clark
Attorney, Agent, or Firm—L. Lee Humphries; H. Fredrick Hamann; Rolf M. Pitts

[57] ABSTRACT

A self-compensating multi-channel laser system of a type having at least two substantially parallel optical channels, each channel having a first optical extremity comprising an optical aperture of said system and further having a second extremity including a photoelectric detector responsive to optical energy propogated toward the second extremity. The system includes mutually oppositely and coaxially disposed first and second laser generators having a common optical axis, the common axis being arranged perpendicular to the mutually parallel optical channels. First and second beam splitters are each disposed substantially along the common optical axis of the coaxial generators and within the optical path of a mutually exclusive one of the two channels. Phase-sensitive feedback modulation means responsive to the time-phase difference between the outputs of said photoelectric detectors compensatorily modulates one of the channels in such sense as to reduce the phase difference.

8 Claims, 1 Drawing Figure

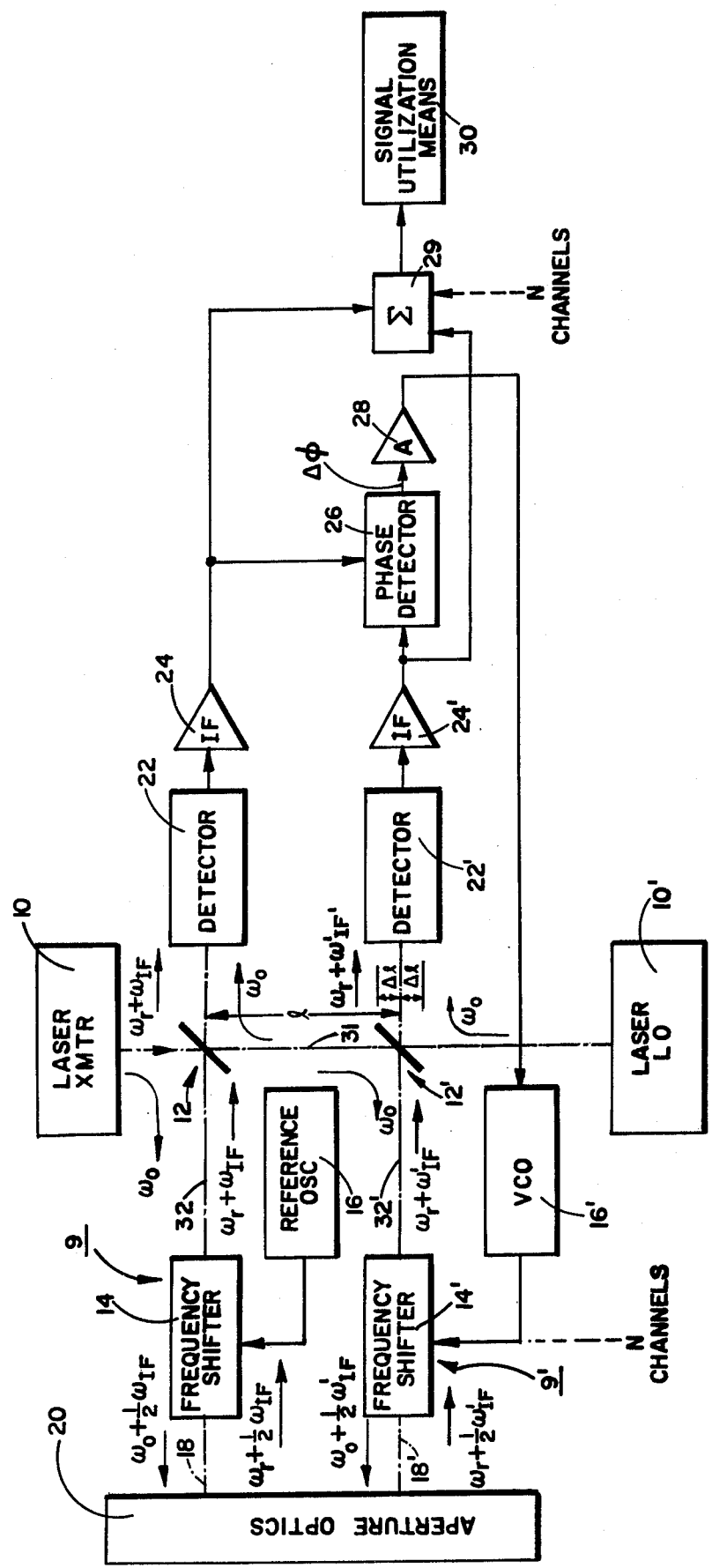

SELF-COMPENSATING INTERFEROMETER

This application is a continuation-in-part of Application Ser. No. 282,621 filed Aug. 21, 1972 and now abandoned by Cecil L. Hayes et al. and entitled Self-Compensating Interferometer.

BACKGROUND OF THE INVENTION

This invention is in the field of optical interferometers.

In the field of optical interferometry (employing, say, lasers or other sources of electromagntic energy), it is often deemed desirable to illuminate a target area by means of an array of radiating apertures to achieve minimum beam width, the concept of minimizing the far-field beam pattern in one dimension by means of near-field aperture enlargement or shaping in such dimension being one well understood in the art. The effectiveness of such an approach is limited, however, due to the effects of atmospheric anomalies which cause time-phase differences among the target-illuminating wave forms provided by the several apertures of the array. In other words, the several waveforms may tend to somewhat subtractively combine, rather than additively combine, in so illuminating the target due to such phase differences among them. A number of deleterious effects, both external and internal of the electromagnetic energy transmitting and receiving system, may combine to reduce the system performance in illuminating and detecting a selected target.

Atmospheric effects, target motion, thermal expansion or contraction and mechanical vibration of system components, and optical path length changes in the system and other disturbances are normally manifested in an interferometer system as phase differences in the received signals thereof, thereby reducing system performance or signal-to-noise ratios in a sum channel thereof.

Prior to the disclosed invention, no known art existed by which to simply and effectively compensate for all these undesirable changes which degrade performance of an optical interferometer system, particularly thermal component drift and system phase error. However, component hardware is available in the art from which to fashion a solution to these performance problems by means of the concept of the invention.

SUMMARY OF THE INVENTION

By means of the concept of the invention, the above-noted limitations of the prior art may be avoided and a self-compensating interferometer system provided having improved performance.

In a preferred embodiment of the invention there is provided a self-compensating multi-channel laser system of a type having at least two substantially parallel optical channels, each channel having a first optical extremity comprising an optical aperture of said system and further having a second extremity including a photoelectric detector responsive to optical energy propogated toward the second extremity. The system includes mutually oppositely and coaxially disposed first and second laser generators having a common optical axis, the common axis being arranged perpendicular to the mutually parallel optical channels. First and second beam splitters are each disposed substantially along the common optical axis of the coaxial generators and within the optical path of a mutually exclusive one of the two channels. Phase-sensitive feedback modulation means, responsive to the time-phase difference between the outputs of the photoelectric detectors, compensatorily modulates one of the channels in such sense as to reduce the phase difference.

In normal operation of the above-described arrangement, the modulation of the response of the second or additional channel in such sense as to reduce the phase difference between such modulated channel and the first or reference channel, serves to compensate for the effects of variations in internal optical path lengths in the system (due to mechanical vibration) and component performance, and also compensates for external effects such as atmospheric turbulence and the like, whereby the received energies in such channels may be more effectively combined and increased system performance obtained.

Accordingly it is an object of the invention to provide an improved multiple channel laser system.

It is another object to provide a laser system demonstrating self-compensation for internal effects such as component drift and mechanical vibration.

A further object is to provide a multiple channel laser system which compensates for both internal and external disturbances upon system performance.

These and other objects of the invention will become apparent from the following description, when taken together with the accompanying drawing in which:

BRIEF DESCRIPTION OF THE DRAWINGS

FIG. 1 is a block diagram of a preferred embodiment of a system in which the concept of the invention may be advantageously employed.

DESCRIPTION OF THE PREFERRED EMBODIMENT

Referring to FIG. 1, there is illustrated in block diagram form an interferometer type or multiple channel electromagnetic energy system, such as a laser system, for illumination and detection of a target. Such system comprises a self-compensating multi-channel electromagnetic energy system of a type having at least two substantially parallel channels, each of said channels having a first extemity 18 or 18' comprising an aperture of said system and further having a second extremity including a non-linear detector 22 or 22' responsive to electromagnetic energy propogated toward said second extremity. The outputs of the detectors of each of a channels may be combined or added by signal summing means 29 for utilization by signal utilization means 30, as is understood in the art. There is further provided mutually oppositely and coaxially disposed first and second like electromagnetic energy generators or laser sources 10 and 10' having a common optical axis 31, said common axis being arranged perpendicular to the mutually parallel optical channels for generating a carrier frequency $\omega_o$. A first and second beam spliiter 12 and 12' are each substantially disposed along said common optical axis 31 of the coaxial generators 10 and 10' and within the optical path 32 or 32' of a mutually exclusive one of the two channels 9 and 9', a first one 10 of the generators cooperating with said beam splitters 12 and 12' as a transmitter of energy out of the apertures of said system, the second one 10' of the generators cooperating with beam splitters 12 and 12' as a local oscillator. Second generator 10' may, for convenience, be comprised of a mirror system responsive to energy from transmitter 10 for providing a receiver local oscillator function.

There is also provided in the arrangement of FIG. 1 intermediate frequency signalling means in each of channels 9 and 9' and comprising a frequency modulator 14 or 14' interposed at the aperture end of each of channels 9 and 9' and responsive to a radio frequency oscillator 16 or 16', and a tuned intermediate frequency amplifier 24 or 24' responsive to the output of the detector 22 or 22' in such channel, the radio frequency oscillator 16' of the modulated channel 9' being a voltage controlled oscillator.

There is further provided phase-sensitive feedback modulation means responsive to the time-phase difference between the outputs of photoelectric detectors 22 and 22' for compensatorily modulating one of the channels in such sense as to reduce the phase difference. Such phase-sensitive feedback modulation means includes two tuned intermediate frequency (IF) amplifiers 24 and 24', each coupled to a respective one of detectors 22 and 22' and a phase-sensitive detector responsive to the outputs of amplifiers 24 and 24' and drivingly coupled to voltage controlled oscillator 16'.

The construction and arrangement of each of the elements of FIG. 1 is well understood in the art. For example, the construction and arrangement of frequency modulators 14 and 14' is known, as indicated at page 927 of IEEE Transactions on Microwave Theory and Technology, No. 11, MTT–17, November 1969. Accordingly, the structural elements of FIG. 1 are shown in block form only for convenience in exposition.

In normal operation of the above-described arrangement, laser transmitter 10 transmits energy of, say, a carrier frequency $\omega_o$ towards beam splitters 12 and 12', which redirect such transmitter energy along a respective one of optical paths 32 and 32' toward an aperture end of channels 9 and 9' (to the left as illustrated). The carrier frequency of such energy, as propogated through a respective one of modulators 14 and 14', is frequency-translated by the cooperation of an associated one of oscillators 16 and 16' by an incremental amount $\frac{1}{2}\omega_{IF}$, corresponding to one-half a selected intermediate frequency $\omega_{IF}$. Actually, the frequency shift ($\frac{1}{2}\omega'_{IF}$) provided by VCO 16' may differ from that ($\omega_{IF}$) provided by stable local oscillator 16 due to any control inputs applied to VCO 16', to be described more fully hereinafter. Upon radiation of the frequency translated carrier ($\omega_o + \frac{1}{2}\omega_{IF}$) from the system apertures and illumination of a target thereby, reflections from the target ($\omega_r + \frac{1}{2}\omega_{IF}$) are detected at the system apertures and propogated through the frequency modulators 14 and 14'. The carrier frequency of the received reflections from the target may differ from that of the transmitted carrier ($\omega_r - \omega_o \neq 0$) by the amount of any doppler shift induced by radial motion of the target relative to the system aperture, as is well understood in the art. However, neither the absence nor presence of such phenomenon is of consequence in the practice of the invention, as will be made more clearly apparent hereinafter.

Upon translation of the received signals through modulators 14 and 14', the carrier frequencies thereof are again shifted by an additional amount $\frac{1}{2}\omega_{IF}$, wherefore one such carrier frequency may be $\omega_r + \omega_{IF}$. Propogation of the frequency-translated received signals through beam splitters 12 and 12' toward non-linear detectors 22 and 22', together with the propogation of the local oscillator carrier $\omega_o$ from L.O. element 10' via the beam splitters 12 and 12' to detectors 22 and 22' results in a beat frequency output signal at each of detectors 22 and 22', corresponding to the frequency difference therebetween ($\omega_r - \omega_o + \omega_{IF}$), due to the nonlinear action of such detectors. Such nonlinear detection, in producing a beat frequency output corresponding to the frequency difference between two applied carriers, is well understood in the art, as indicated by the description of receiver-mixer 13 of FIG. 1 in U.S. Pat. No. 3,745,578 issued to Carl R. Barrett et al., for Multiple Frequency Radar System Having Improved Response to Small Targets. Due to the bandpass limiting of such detectors only the difference frequency, and not also the sum frequency, is manifested at the output of detectors 22 and 22'. Such difference frequency output will vary from intermediate frequency $\omega_{IF}$ by only the amount of any observed doppler shift due to target motion. Such nominal intermediate frequency signals are then amplified by tuned IF amplifiers 24 and 24' to improve the signal-to-noise ratio thereof, as is well understood in the art.

Phase-detector 26, in response to the inputs thereto from amplifiers 24 and 24', cooperates with an amplifier 28 to provide a control input signal input to VCO 16' to modulate the intermediate frequency translation or frequency shift provided by modulator 14', the sense of such modulation being preselected to result in a reduction of the phase difference ($\Delta\phi$ radians) detected by phase detector 26. In other words, the change in frequency output ($\Delta\omega$ radians/second) of VCO 16' (or consequent change in frequency shift $\Delta\omega_{IF}$ provided by modulator 14') as a consequence of an applied control input to VCO 16' may be viewed as a rate of change of phase ($d\phi/dt$ radians/second), as is well understood in the art of time-phase signal modulation. In this way, the phase of the received signal in the second channel 9' is made to track that of the first or reference channel 9, whereby the system performance as manifested at the output of summing means 30 is enhanced.

Although the cooperation of only one slave channel 9' with master or reference channel 9 has been illustrated, it is understood that additional slave channels (of a multi-channel system) may be incorporated by the insertion of an additional beam splitter along common axis 31 and intermediate sources 10 and 10' for each such added channel, together with an associated modulator 14', VCO 16', non-linear detector 22', IF amplifier 24', phase detector 26 and associated amplifier 28. Hence, it is to be understood that by means of the above-described concept, the phase-error for a given slave channel 9' is reduced, relative to the reference channel 9 in a multiple channel or interferometer type electromagnetic energy system, without regard to the source or origin of such phase error. Hence, changes in optical path length $\mp \Delta l$ due to vibration within the system or propogation delays due to atmospheric turbulence external to the system, for example, will be compensated for in each such slave channel by means of the compensation feedback means described. Also, by means of the mutually opposed sources 10 and 10' employed with beam splitters 12, 12' ... 12n only a single array of such beam splitters need be employed and serves both the transmission and receiver local oscillator modes of the system, and the necessity of dual arrays is avoided. Further, because the propogated (and received) electromagnetic energy traverses the IF frequency shifters 14 and 14' twice, the effect of the compensatory modulation imparted by the cooperation of modulator 14', VCO 16', amplifier 28 and phase detector 26, in reducing system phase error, is enhanced.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A multi-channel electromagnetic energy system of a type having at least two substantially parallel channels, each of said channels having a first extremity comprising an aperture of said system and further having a second extremity including a non-linear detector responsive to electromagnetic energy propogated toward said second extremity, said system further including in combination mutually oppositely and coaxially disposed first and second like electromagnetic energy generators having a common optical axis, said common axis being arranged perpendicular to said mutually parallel optical channels;

a first and second beam splitter each substantially disposed along said common optical axis of said coaxial generators and within the optical path of a mutually exclusive one of said two channels, a first one of said generators cooperating with said beam splitters as a transmitter of energy out of said apertures of said system and a second one of said generators cooperating with said beam splitters as a local oscillator; and phase-sensitive feedback modulation means responsive to the time-phase difference between the outputs of said photoelectric detectors for compensatorily modulating one of said channels in such sense as to reduce said phase difference.

2. A multi-channel electromagnetic energy system of a type having at least two substantially parallel channels, each of said channels having a first extremity comprising an aperture of said system and further having a second extremity including a non-linear detector responsive to electromagnetic energy propogated toward said second extremity, said system further including in combination mutually oppositely and coaxially disposed first and second like electromagnetics energy generators having a common optical axis, said common axis being arranged perpendicular to said mutually parallel optical channels;

a first and second beam splitter each substantially disposed along said common optical axis of said coaxial generators and within the optical path of a mutually exclusive one of said two channels, a first one of said generators cooperating with said beam splitters as a transmitter of energy out of said apertures of said system and a second one of said generators cooperating with said beam splitters as a local oscillator; and compensatory intermediate frequency signalling means responsive to the time-phase difference between the outputs of said photoelectric detectors for compensatorily modulating one of said channels in such sense as to reduce said phase difference.

3. The device of claim 2 in which said compensatory intermediate frequency signalling means comprises a frequency modulator interposed at said aperture end of each of said channels and responsive to a radio frequency oscillator; and a tuned intermediate frequency amplifier responsive to the output of a respective detector in each said channel, the radio frequency oscillator of said modulated one of said channels being a voltage controlled oscillator, said compensatory intermediate frequency signalling means including a phase-sensitive detector drivingly coupled to said voltage controlled oscillator.

4. A self-compensating multi-channel laser system of a type having at least two substantially parallel optical channels, each of said channels having a first optical extremity comprising an optical aperture of said system and further having a second extremity including a photoelectric detector responsive to optical energy propogated along said channel twoard said second extremity, said system further including in combination mutually oppositely and coaxially disposed first and second laser generators having a common optical axis, said common axis being arranged perpendicular to said mutually parallel optical channels;

phase-sensitive feedback modulation means responsive to the time-phase difference between the outputs of said photoelectric detectors for compensatorily modulating one of said channels in such sense as to reduce said phase difference.

5. A self-compensating multi-channel laser system of a type having at least two substantially parallel optical channels, each of said channels having a first optical extremity comprising an optical aperture of said system and further having a second extremity including a photoelectric detector responsive to optical energy propogated along said channel toward said second extremity, said system further including in combination mutually oppositely and coaxially disposed first and second laser generators having a common optical axis, said common axis being arranged perpendicular to said mutually parallel optical channels;

a first and second beam splitter each similarly oriented and disposed substantially along said common optical axis of said coaxial generators and within the optical path of a mutually exclusive one of said two channels.

6. A self-compensating multi-channel laser system of a type having at least two substantially parallel optical channels, each of said channels having a first optical extremity comprising an optical aperture of said system and further having a second extremity including a photoelectric detector responsive to optical energy propogated along said channel toward said second extremity, said system further including in combination mutually oppositely and coaxially disposed first and second laser generators having a common optical axis, said common axis being arranged perpendicular to said mutually parallel optical channels;

a first and second beam splitter each similarly oriented and disposed substantially along said common optical axis of said coaxial generators and within the optical path of a mutually exclusive one of said two channels; and phase-sensitive feedback modulation means responsive to the time-phase difference between the outputs of said photoelectric detectors for compensatorily modulating one of said channels in such sense as to reduce said phase difference.

7. The device of claim 6 in which said detectors are substantially non-linear and in which there is further provided intermediate frequency signalling means in each of said channels, comprising
 a frequency modulator interposed at said aperture end of said channel and responsive to a radio frequency oscillator, and
 a tuned intermediate frequency amplifier responsive to the output of said detector in said channel, the radio frequency oscillator of said modulated one of said channels being a voltage controlled oscillator, said phase-sensitive feedback modulation means including a phase-sensitive detector drivingly coupled to said voltage controlled oscillator.

8. The device of claim 7 in which the frequency of said radio frequency oscillator of other than said modulating one of said channels corresponds to one-half the tuned intermediate frequency of said tuned intermediate frequency amplifiers.

* * * * *